United States Patent [19]
Laing et al.

[11] 4,445,566
[45] May 1, 1984

[54] LATENT HEAT STORAGE MEANS

[76] Inventors: Karsten Laing, Kaiserallee 51, 7500 Karlsruhe; Oliver Laing, Weissdornweg 14, 7400 Tübingen; Inge Laing, Hofener Weg 35-37, 7148 Remseck 2, all of Fed. Rep. of Germany

[21] Appl. No.: 358,809

[22] Filed: Mar. 16, 1982

[30] Foreign Application Priority Data

Mar. 16, 1981 [CH] Switzerland .................. 1754/81

[51] Int. Cl.³ .............................................. F28D 17/00
[52] U.S. Cl. ............................. 165/10; 165/11 R; 165/109 R; 165/104.11
[58] Field of Search ............... 165/10, 104.11, 11, 165/109

[56] References Cited

U.S. PATENT DOCUMENTS

| | | | |
|---|---|---|---|
| 3,163,209 | 12/1964 | Shinn | 165/163 X |
| 3,452,720 | 7/1969 | Lawrence | 165/10 X |
| 3,485,216 | 12/1969 | Lawrence | 165/10 X |
| 3,492,461 | 1/1970 | Lawrence | 165/10 X |
| 4,063,546 | 12/1977 | Schmid et al. | 165/10 X |

Primary Examiner—Albert W. Davis, Jr.
Attorney, Agent, or Firm—Pennie & Edmonds

[57] ABSTRACT

Latent heat storage means having, fusible at a pre-determined temperature, a mass which is traversed by heat exchanger surfaces and which fills a container jointly with the heat exchanger, characterized in that the container is constructed as a cylindrical vessel while the heat exchangers are formed from elongated strips wound spirally about a vertical axis.

13 Claims, 8 Drawing Figures

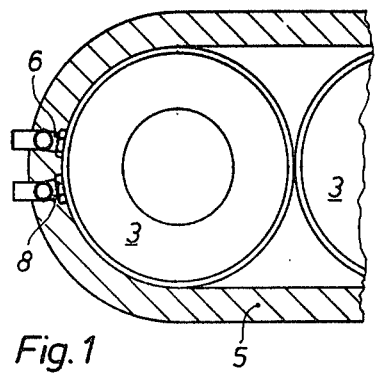
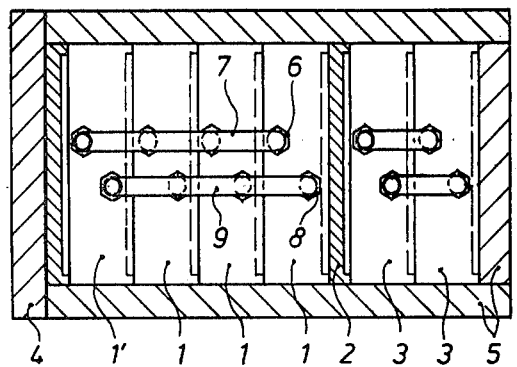
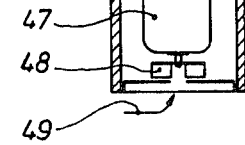
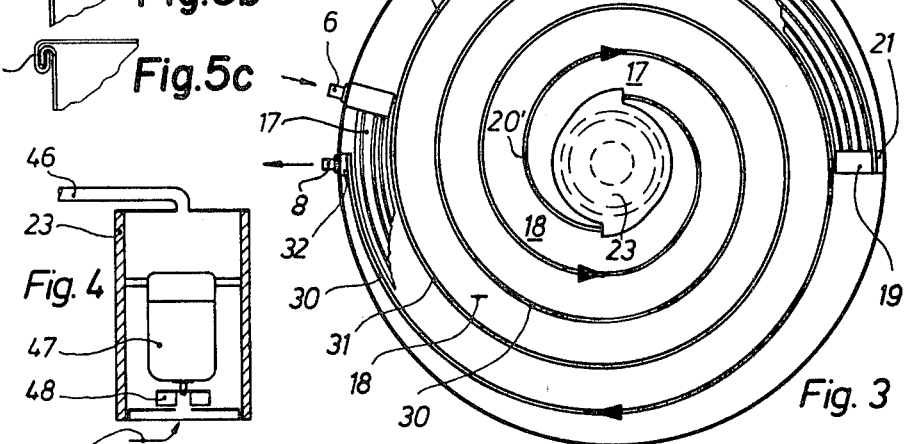
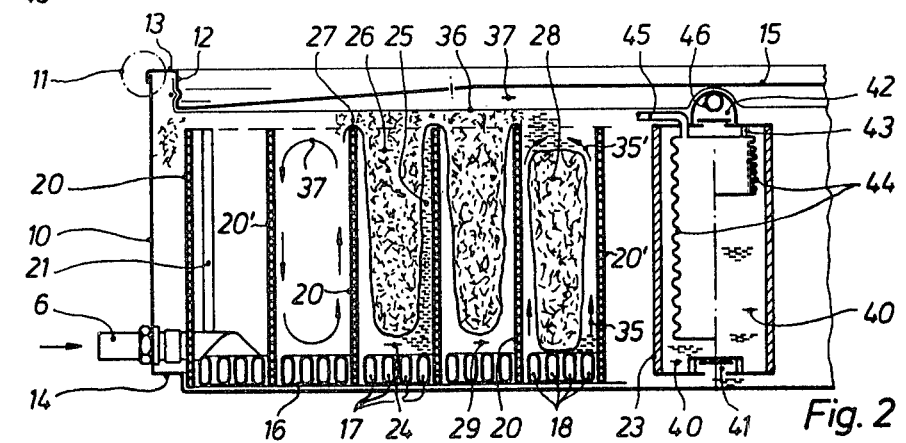

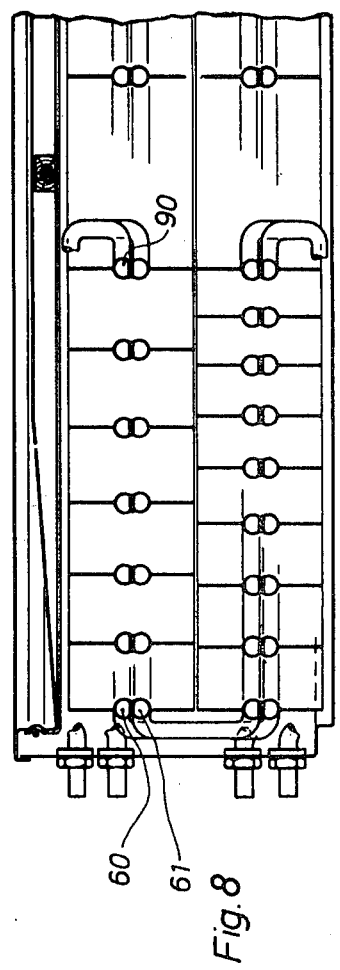
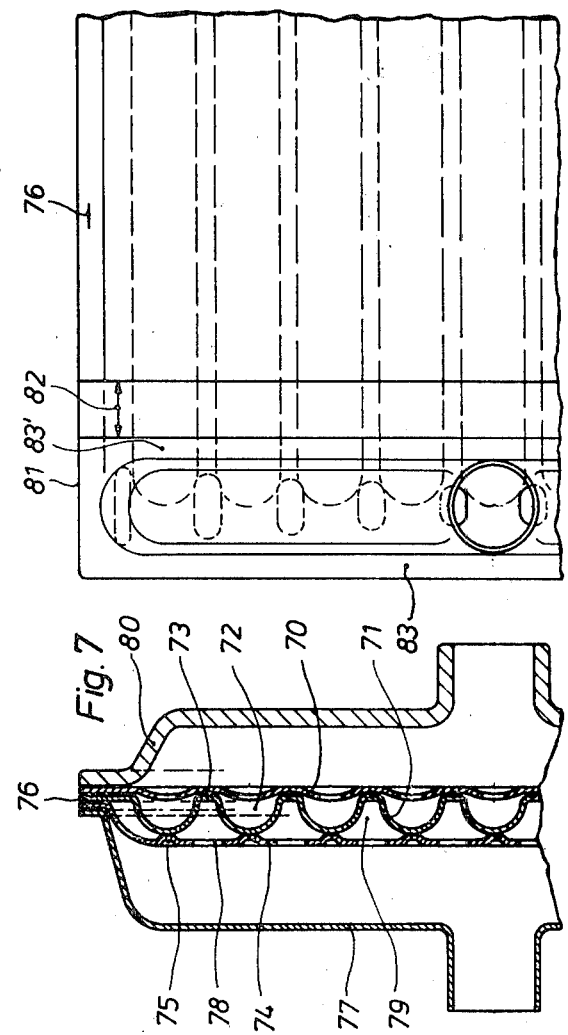
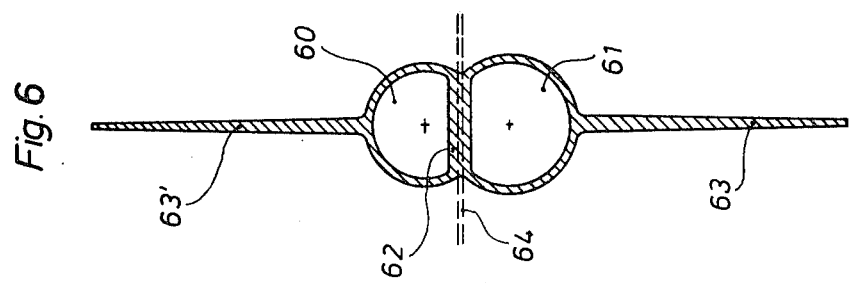

LATENT HEAT STORAGE MEANS

FIELD OF THE INVENTION

The invention relates to latent heat stqrage means in which the storage mass is accommodated by containers which are traversed by large-area hollow bodies through which flow heat carrier means.

BACKGROUND OF THE INVENTION

Known latent heat storage means suffer from the drawback that their capacity diminishes with the number of charging cycles and is finally lost completely, since the seed crystals stratify. Therefore, constructions have been devised in which crystallisation takes place on the surface of rotary tube heat conveyors so that a constant recirculation of the molten mixture is assured and stratification of the seed crystals is obviated.

Furthermore, latent heat storage means have become known wherein stratification is prevented by motor driven agitators. The incorporation of motor driven recirculating devices into the storage means construction results in a constant consumption of driving energy.

DESCRIPTION OF THE INVENTION

Furthermore, methods have become known which make possible a static construction of the storage means by using thickening substances to fix regularly disperse seed crystals in the molten mixture. Since, however, differences in density constantly exist between the crystalline and the molten state, in the event of variations in volume, there act on the walls of the container and in particular also on the heat conveyor elements forces which can result in deformation and in the long run destruction, because by virtue of the increase in volume upon fusion of the previously crystalline storage mass, zones occur in which extremely high pressures can build up. The forces which are thus occasioned distort both the container wall and also the heat conveyors. In contrast to heating systems, the part of the molten mass which goes beyond the starting volume cannot be introduced into high containers, because it would freeze. When shrinkage occurs during crystallisation resulting from heat withdrawal, cavities occur in the storage mass which in turn lead to uncontrollable stresses due to the action of atmospheric pressure.

Finally, no method has as yet come to light by which it is possible to indicate the state of charge without any considerable complication. Regulation of the energy source, e.g. the heat pump as a function of the state of charge is, however, a vital prerequisite in the avoidance of harmful over-heating and for any economic storage means operation.

The invention indicates a way by which the aforesaid drawbacks can be avoided. The invention provides for mass-filled storage tanks. According to the invention, these are constructed as cylindrical vessels, the weight of which allows them to be carried one at a time even up staircases and into cellars. At the erection site, they can then be combined to form storage columns. In such a vessel there is a large-area hollow body traversed by a heat carrier and which serves as a heat conveyor traversing the storage mass at specific intervals and being constructed in the form of spirals with a vertically extending axis. The invention provides for the hollow body heat conveyors to be in the form of converging entering spirals and diverging exiting spirals which connect with each other at the center of the vessel with the total number of entering spirals equating the total number of exiting spirals such that the total number of spirals is an even number. As a result, the temperature of the heat conveyor in the entering spirals diminishes from the periphery towards the centre, while in the case of the exiting spirals the temperature drops from the centre towards the periphery. The spiral of storage mass enclosed between an entering and an exiting spiral therefore undergoes more or less the same accretional dissipation of heat at every point along its length, so that always the total surface area of the heat conveyor participates in the heat exchange.

Since the adhesion of the crystalline storage mass on the heat exchanger surfaces is interrupted directly after absorption of the charge, due to formation of a fusion layer, the forces feared cannot develop due to localised increase in volume, because the excess molten mixture rises along the heat exchanger surfaces and collects on them.

According to the invention, therefore, the walls of the hollow bodies are disposed in such a way that they extend vertically. The excess molten mixture arising from the increase in volume therefore rises upwardly. It is possible according to the invention to dispose there a diaphragm of elastic material which separates the space filled with the storage mass from a space which is filled with gas.

This diaphragm can therefore yield within the framework of the volumetric increase. Since the volume available for the enclosed gas diminishes to the same extent, the gas pressure in this space rises as the charge increases. This process occurs at a constant temperature, namely the fusion temperature, so that the pressure increase is a direct measure of the state of charge.

The system described is suitable for all storage masses in which differences in density of the components of the storage mass do not result in segregation. If, on the other hand, it is intended to use storage masses which have a tendency to separate, then a further problem is that of conveying the heavier layers of the molten mixture into the highest lightest layers of the separated molten mixture, resulting in the desired re-mixture.

To this end, the invention utilises the difference in density between the molten mixture and the crystalline phase. In the case of storage masses which have low viscosity mixtures, after fusion of the storage mass, the difference in temperature between the odd and the cooler even spirals results in all areas of the container in a torroidal flow which leads to an intimate re-mixture of the entire molten mass.

In the case of storage masses, the melt of which has a high viscosity, according to the invention, a second horizontally extending heat conveyor at the bottom of the container prededes the heat conveying spiral hollow members and is therefore traversed by the hottest heat conveyor during charging. Both these heat conveyors are therefore traversed by the heat carrier in such a way that fusion occurs in the highest area of the crystalline mass but only after a considerable part of the storage mass in the lower area has already been fused. As a result of this arrangement, during charging of the storage means, a relatively thick molten zone develops below the crystalline spiral body of storage mass which is still cohesive in the upper zone of the spiral heat conveyor, resulting in molten zones which become increasingly thinner from the bottom upwards as they extend along the vertical spiral heat conveyor walls until finally even the layer of storage mass which projects beyond the level of the heat carrier fuses. Only when the melt has reached this highest level is fixing of the spiral solid body of storage mass on the heat conveyor surfaces completely stopped. The specifically heavier crystalline core thereupon drops downwards and compresses the melt located there beyond the level of the crystalline residue. The segregation which sets in as charging states lengthen due to enrichment of the melt which is close to the bottom by the admixture of heavier parts is stopped again by the conveyance of molten mass from the lowest level to the highest level. The process therefore restores an even concentration of the molten mixture and leads to an homogenous re-distribution of previously dropped or risen seed crystals. The method is therefore all the more effective the greater is the geodetic height of the column of storage mass.

The bottom can be heated up if a plurality of storage means of different temperatures are stacked on one another so that the storage means with the highest working temperature is lowest down and then the bottom of whichever is the next higher container is heated by the container below it to a temperature which is above the fusion temperature of the storage mass located in the higher container.

The storage means according to the invention will be advantageously discharged by an oppositely directed through flow of heat conveyor. However, if there is provision for simultaneous charging and discharging, then the invention preferably provides two heat carrier circuits. With a correspondingly pressure-resistant construction, then, the storage means can be used simultaneously as a vaporiser or liquidiser of a heat pump.

According to the invention, a further possibility of re-mixing separated melt lies in the disposition of a small pump in the storage container.

It is intended to describe the invention with reference to embodiments which are in turn to a certain extent separate inventions.

BRIEF DESCRIPTION OF THE DRAWINGS

In the accompanying drawings:

FIG. 1 shows a latent heat storage means in vertical and horizontal section;

FIG. 2 shows a storage module of this latent heat storage means in section;

FIG. 3 shows the construction of the spiral heat conveyors;

FIG. 4 shows a pump;

FIG. 5 shows the steps involved in closing the container;

FIG. 6 shows a cross-section through a heat conveyor element which can be extruded;

FIG. 7 shows an equivalent element of sheet metal construction, and

FIG. 8 shows a latent heat storage means which at the same time forms the liquidiser of a heat pump.

DESCRIPTION OF THE PREFERRED MODES

FIG. 1 shows a latent heat storage means with insulation. The latent heat storage means comprises a plurality of modules which are stacked one upon another. If different temperatures are required and the molten mixture is viscous, the module 1' with the highest working temperature is disposed at the bottom and is followed by those with lower temperatures. In the case of low viscosity melts, the modules with the lower working temperature are installed below those with a higher working temperature. Advantageously, in the event of considerable differences in temperature, the group 1', 1, 1 is separated by an insulating layer 2 from a further group of modules 3, 3 which contain storage masses having a higher fusion temperature than those lower down. The modules 1 are erected on a glass foam panel 4 and the resultant column is enclosed by an insulating layer 5. The inlet connectors 6 are connected by pipelines 7 and the outlet connectors 8 by pipelines 9 so that the heat conveyors of the individual modules present in the storage means are traversed parallel with one another.

FIG. 2 shows a vertical section through a module comprising the trough-shaped container 10 which is tightly sealed by the lid 12 closing over a rebate 11. FIG. 3 shows a horizontal section of a reduced scale. The superposed modules are secured against radial displacement by the projection 13 and the narrowed zone 14, which fit one into the other. As a result of the conical zone 15 of the lid 12, the bottom of the next higher module is also supported in the centre. A heat exchanger panel 16 is disposed in the bottom. This heat exchanger panel 16 has an assembly of passages 17 extending between the spiral lines 30 and 31 and a second assembly of passages 18 extending between the spiral lines 31 and 30. The assemblies of passages have medium flowing through them in opposite directions and communicate with one another at the centre through a connecting line, not shown. The heated heat carrier flow which serves for charging passes through the inlet connector 6 into the assembly of passages 17, is transferred at the centre to the assembly of passages 18 and when it reaches the periphery enters the manifold 19 which communicates with the manifold 21 which in turn communicates with the elongated hollow body 20. This hollow body 20 likewise extends on spiral lines which develop from the outside inwardly and through which medium passes in the direction of the arrow 22. In the centre, constructed as a hollow cylinder, is a header 23, into the annular space in which the interior of the hollow body 20 discharges. A second likewise spirally disposed hollow body 20' likewise communicates with the annular space of the header 23 and develops from the centre towards the periphery along the spiral line 30. It ends at the vertically extending header 32 which merges into the discharge connector 8 which is disposed at the top for reasons of ventilation.

The container 10 is filled with storage mass 26. During charging, fusion occurs firstly in the lower zone 24 in which the heat exchange panel 16 is located. At the same time, on the surface of the hollow bodies 20 and 20', an upwardly increasingly thinner film of molten mixture 25 fuses. Once about half the storage mass 26 has fused, now the webs 26 between the upper edges of the hollow bodies 20 and 20' and the upper surfaces of the crystalline storage mass body also fuse.

As soon as this zone 23 has melted through completely, the remaining core of storage mass 28, by virtue of its higher density, falls downwards so that the molten mass 29 in the bottom half is forced upwardly in accordance with the arrows 35 and 35', producing re-mixture of the melt which has a tendency to separate during the storage period. There is now a commencement of convection flow according to arrows 37', since the hollow body 20 is at a higher temperature than the hollow body 20'. A rubber-elastic film 36 separates the space 37 from the space which is filled with storage mass 26.

The effect of the reduction in density during fusion is that the molten mass projects above the upper surface of the storage mass body 28 and produces a minimal over-pressure in the gas which is then closed in the space 37. This over-pressure actuates a pressure switch because it is a measure of the degree of charge of the storage means. Only when the crystalline residues have fused does the temperature suddenly rise, an indication that the latent heat storage means is fully charged. In the case of storage masses, the solid phase of which is lighter than the molten mass, the compensating space 37 is disposed at the bottom, with the diaphragm 36.

According to the invention, re-mixture can also be achieved by other apparatus: A mechanical re-mixing arrangement is shown in the centre of FIG. 2. The interior 40 of the hollow cylinder 23 is closed at both its axial ends. A check valve 41 in the bottom permits intake and a second check valve 42 in the lid permits discharge of molten mass. A corrugated member 44 is connected by spacers 43 to a compressed air line 45 into which compressed air enters in cycles. The right-hand side shows the corrugated member 44 in its contracted position while the left-hand side shows it in its inflated position. By cyclic introduction of compressed air, molten mass passes through the valve 41 into the interior 40 during the pauses. As a result of the intake of air, this molten mass 40 is forced through the valve 42 and into the pipe 46 which ends close to the periphery of the container 10.

According to the invention, therefore, the storage vessel can also be constructed without a heat exchanger panel 16. If re-mixture by thermal convection is inadequate, then the invention provides the pump 41, 42, 43, 44.

FIG. 4 shows another embodiment of a pump in the hollow cylinder 23. An electric motor 47 drives a centrifugal impeller 48 which (as indicated by the arrow 49) draws in molten mass and conveys it through the pipe 46 to the periphery.

FIG. 5 shows the stages upon closure of the seal 11 in the first stage 50, in the second 51 and in the third stage 52.

FIG. 6 shows an extrusion of copper or aluminium in which two passages 60 and 61 are separated from each other by a wall 62, the ribs 63 and 63' furthermore serving to convey heat to the storage mass. Between broken lines 64, the pipes can be separated from one another in which case the remaining wall elements have the same wall thickness as the other areas of the walls of the pipes 60 and 61. In addition, in the terminal zone, the two ribs 63 and 63' are sawn off, the pipes 60 and 61 are bent apart somewhat and are then so flared that two round pipes are formed at the ends.

FIG. 7 shows a double heat conveyor, e.g. for a freon circuit and a water circuit. The freon-filled passages 72 are produced from sheet metal strip 70 and sheet metal strip 71 by roll-forming. These strips are roll spot welded to one another at 73. This unit is connected to a cover plate 74 by projection welding. To this end, studs 75 are impressed into the cover plate at regular intervals. On the encircling edges, the zones 70, 71 and 75 merge together and are welded to one another along the edges by a roll spot weld 76. Headers are disposed at the axial ends. The header 77 serves to supply water. The water passes through stamped-out apertures 78 into the water passages 79. The freon header 80 is of heavy gauge construction an is welded to sheet metal parts 70, 71, 75 and 77 along the periphery 81 and 83. The portion 82 tapers and follows the contours of the plate 70 to which it is welded along the thin edge.

FIG. 8 shows a storage module having two superposed spirals made from the heat exchange profile according to FIG. 6. One of the pipes 60 or 61 can serve to liquidize or even evaporate freon. The storage means thus becomes an integral component of the heat pump circuit. The spiral is so wound that inlet occurs in the area 90 and extends in two planes.

According to the invention, it is ideal for two latent heat storage means to be connected in series, the storage masses being at different temperatures, e.g. 34° C. and 47° C. If the heat requirement is low, then the charge limiter which shuts down the heat pump is, for example by means of an outside thermostate, so operated that condensation of the working medium takes place at approx. 37° C. If the heat requirement increases, then the heat pump is operated by the charge limiter of the 47° storage means. In such a case, firstly the 34° storage means and subsequently the 47° storage means will be charged. During discharge, the heat conveyor flows back firstly through the 34° storage means, after which it is passed through the 47° storage means. In the case of minimal heat requirement, heat is preferably drawn from the 34° storage means while the 47° storage means is discharged only pulse-wise, with a pulse interval relationship depending upon the heat requirement.

We claim:

1. Latent heat storage means having a cylindrical housing, a heat storage mass in said housing, heat conveyor passages in said housing through which a heat carrier is adapted to flow to charge or discharge the storage mass, an inlet connector through which heat carrier flows into said housing and a discharge connector through which heat carrier flows out of said housing, characterized in that the heat conveyor passages comprise hollow bodies in the form of at least one converging spiral converging in the direction of heat carrier therethrough and at least one diverging spiral diverging in the direction of heat carrier therethrough, each said converging spiral communicating with each said diverging spiral at the center of said housing, all said spirals being concentric with said housing, a vertically extending manifold connecting all said converging spirals with one connector and a vertically extending header connecting all said diverging spirals with another connector.

2. Latent heat storage means according to claim 1 further characterized in that the height of the cylindrical housing is less than its radius to form a comparatively flat unit.

3. Latent heat storage means according to claim 2 further characterized in that one said unit may be stacked on another said unit to form a stack of units.

4. Latent heat storage means according to claim 1 further characterized in having pumping means for re-mixing of segregating storage mass.

5. Latent heat storage means according to claim 4 further characterized in that said pumping means includes a closed cylinder, an inlet check valve in the bottom of said cylinder, an outlet check valve in the top of said cylinder, a corrugated member in said housing connected to a source of compressed air, and means for cyclically introducing compressed air in said corrugated member to cause said member to cyclically expand and contract to impart a pumping action within said cylinder.

6. Latent heat storage means according to claim 1 further characterized in that said pump means comprises a centrifugal impeller.

7. Latent heat storage means according to claim 4 further characterized in that a further heat conveyor is positioned at the bottom of said housing.

8. Latent heat storage means according to claim 4 further characterized in that said pump means conveys molten storage mass over the vertical extent of the housing.

9. Latent heat stroage means according to claim 1 further characterized in that said heat conveyor passages comprise an extruded profile having a plurality of passages therein.

10. Latent heat storage means according to claim 9 further characterized in that said conveyor passages form two groups.

11. Latent heat storage means according to claim 10 further characterized in that the two groups of passages are separated by a wall the thickness of which is at least twice as great as the wall thickness of the passages.

12. Latent heat storage means according to claim 10 further characterized in that a first group of passages comprises plates connected to one another by welded seams and a second group comprises plates connected to one another by projection welds.

13. Latent heat storage means according to claim 1 further characterized in having a gas filled space in said housing including a pressure sensitive switch for indicating when said storage mass has become charged.

* * * * *